(12) United States Patent
Holt

(10) Patent No.: X6800
(45) Date of Patent: Oct. 17, 1831

(54) LOOM, REEDS

(76) Inventor: Horace Holt

Horace Holt Rutland Township Ohio

Letters Patent

The schedule referred to in these Letters Patent and making part of the same
Containing a description in the words of the said Horace Holt himself of his
Improvement in Making Sleys or Reeds for Weaving.

Be it known that I Horace Holt of Rutland Township Meigs County and
State of Ohio have made an improvement in making Sleys or Reeds for weaving
which is described as follows. 1st The Frame This is made by tenoning and
mortising together two side pieces about ten feet long; two end pieces about three
feet long; & stands on legs about thirty inches high.

2d The Carriage is of the same length and width of the frame. The winding
and engine is the same as that in common use But the feed instead of being
regulated by a spring as at present, is done by a screw called the feeding screw -
having a catch or spring rod working in the threads of the screw at the end
of the Carriage which carries forward the carriage. One end of this screw
is supported and works in an upright at the end of the frame; and the other
lies on a rest having a cog wheel on its end which matches and works into a
cog wheel on the flyer. When the carriage is to be moved back the spring rod
is disengaged from the screw, or instead of the spring rod a female screw
placed in the end of the carriage into which the male screw may work to
answer the same purpose.

Operation. The reeds after being cut and dressed are put in between the ribs
or side pieces by hand, and the treadles which give the rotary motion are
worked by the foot in the usual way; and the screw which conveys the carriage
regulates the winding and beating up of the thread or twine with the utmost
exactness - At each motion of the foot a split is put in by the hand, and the
twine or thread passed round in the proper place by the operation of the machine.
The improvement which I claim as my invention consists in the feeding screw
as before described in regulating the winding and beating up instead of the spring now in
common use. For a further illustration of my invention I refer to the model and drawing of the same deposited
in the Patent Office City of Washington 5 October 1831

Witnesses [illegible] [illegible]
[illegible]

Horace Holt